United States Patent [19]

Clarke et al.

[11] 4,091,906

[45] May 30, 1978

[54] COLLAPSIBLE SAFETY GUARD FOR PLATFORM LIFT

[75] Inventors: David E. Clarke, Schaumburg; Lawrence I. Richards, Elk Grove Village, both of Ill.

[73] Assignee: Advance Lifts, Incorporated, Elk Grove Village, Ill.

[21] Appl. No.: 772,493

[22] Filed: Feb. 28, 1977

[51] Int. Cl.$^2$ .............................................. F16D 9/00

[52] U.S. Cl. .............................. 192/129 A; 187/1 R; 192/133; 200/61.44

[58] Field of Search ........... 192/129 R, 129 A, 129 B, 192/130, 133, 135, 137; 200/61.42, 61.43, 61.44; 187/1 R, 28, 98

[56] References Cited

U.S. PATENT DOCUMENTS

| | | | |
|---|---|---|---|
| 748,702 | 1/1904 | Conary | 187/98 |
| 2,473,125 | 6/1949 | Alexander | 187/98 |
| 3,541,950 | 11/1970 | Anderson | 192/129 A X |
| 3,737,009 | 6/1973 | Stoddard | 187/98 |
| 3,920,101 | 11/1975 | Richards | 187/1 R X |

FOREIGN PATENT DOCUMENTS

| | | | |
|---|---|---|---|
| 690,910 | 7/1964 | Canada | 187/1 R |

*Primary Examiner*—Howard N. Goldberg
*Attorney, Agent, or Firm*—Lester N. Arnold

[57] ABSTRACT

A collapsible electric foot-toe guard is employed with a loading platform having electric controlled lift and descent movements, functioning as a safety device in the protection against unwitting protrusion of human limbs into the path of descent of the platform lift, said collapsible foot-toe guard being comprised of an outwardly depended contact plate moveably engaging a base support plate through hinge means to permit said contact plate with contact thereof to fold toward the base support plate, such folding movement effective to break a normally open, held closed electric limit switch circuit to arrest descent of the platform lift.

6 Claims, 4 Drawing Figures

COLLAPSIBLE SAFETY GUARD FOR PLATFORM LIFT

BACKGROUND OF THE INVENTION

This invention relates to a safety device particularly useful with an electric controlled hydraulic actuated lift and descent heavy duty loading platform, and more particularly, relates to an improved safety foot-toe guard for the protection of human limbs which guard folds upon contact to collapse away from the encountered obstacle, causing electric deactivation of platform movement.

The enactment of federal safety regulations such as the Occupational Safety and Health Act (OSHA) has brought the need to apply protective devices and safety oriented apparatus to many industrial practices, activities and equipment. One such example has been in the use of floor-recessed heavy duty hydraulic loading platforms, sometimes hereinafter commonly referred to as platform lifts, wherein during the descent of the platform, a human foot or toe could be unwittingly projected beneath the vertical side wall or outer edge of the platform into the direct path of travel thereof so as to be in jeopardy of being smashed or severed upon contact with the descending platform.

It is the field of application of the present invention to provide a collapsible folding foot-toe guard which protrudes from the extreme outer edge or side wall of the loading platform which safety guard will at once both yield to contact with a human limb as well as cause electric deactivation of the hydraulic power source which activates movement of the platform lift. One related prior art device comprises a safety toe guard within the same field of application as the present invention and is disclosed in U.S. Pat. No. 3,920,101, issued Nov. 18, 1975, for which the inventor thereof is the same inventor as for the herein disclosed invention, and the assignor thereof is not a common or related assignor to the assignor of the present invention. The present invention constitutes an improvement over the above-referenced patented safety guard. The safety toe guard of the above-referenced patent is comprised of a flexible band affixed to the side of the platform lift so as to be suspended for likely contact with the lower limb of a person standing too close to the platform lift so that the lower limb of such person would likely be trapped under the platform upon its descent. The distal edge of the flexible band is intended to brush against the leg and warn the person to move his leg. The flexible band yields upon contact but would not cause arrest of the platform movement.

The aforementioned prior art device suffers from the disadvantage of being totally independent from the power actuation means for the platform, independent from either the electric control or the actuation means or the actuators themselves. The person ehdangered may not sense a weak brushing contact with the flexible band and the continued movement of the platform could defeat the application of such flexible band. The flexible band of the aforementioned patent was at best cumbersome and unwidely to be accommodated within the available floor recess which encompassed and housed the fully descended platform. A visual study of the aforementioned prior art safety guard would disclose a flexible band mounted on the upper outer edge portions of a platform so as to provide a protruding flexible band having its distal edge overlapping the adjacent edge portions of the floor that define the platform receiving recess. The flexible band is thereby exposed to misuse and exaggerated wear.

The advent of OSHA regulations brought promulgated commercial standards such as Commercial Standard CS 202-56 Section 1910.30 (3) which therein specifies an inwardly sloping side wall for such platform lifts providing a planar offset between the vertical plane intersecting the top outer edge of the platform side wall and the vertical plane intersecting the lower outer edge of said side wall. The inwardly sloping side wall thus presents a camming surface itself comprising a safety feature in that any projecting foot would be engaged gradually and cammed backwards to encourage the removal of the foot. Thus, the stark vertical side walls of such platform lifts were removed by safety regulations. The sloping side wall now presents a more advantageous mounting location for an improved safety toe guard wherein the safety toe guard could be advantageously stored beneath the floor surface in a non-interfering protected location during non-use of the platform lift, wherein the safety toe guard could be brought into direct contact with the inner extremes of the protruding limb and would not be dependent upon user recognition and reaction in order to be effective, and further wherein the movement of the toe guard would be useful to effect an immediate arrest of the descending movement of the platform lift.

SUMMARY OF THE INVENTION

It is therefore an object of the present invention to provide an improved safety foot-toe guard for use with electric controlled hydraulic actuated heavy duty platform lifts to directly arrest descent of the platform.

It is an object of the invention to provide arrest thereof through electric deactivation of said descent activating power means.

It is another object to provide a collapsible safety device having a contact plate which moves away from contact with an encountered obstacle, and employs said direction of movement to cause said electric deactivation.

It is yet another object of the invention to provide an improved safety device which is more conveniently mounted on said platform to be generally inaccessible when said platform is inactive and is received into a suitable floor recess.

A collapsible safety guard for an electric controlled powered moving heavy duty platform lift is comprised of generally elongated base plate means securable to a peripheral side wall of the platform lift, hinge means, a generally correspondingly elongated contact plate means rotatingly engaging the base plate means through the hinge means, said contact plate selectively positioned to extend outwardly from said base plate means and collapsible upon contact with an encountered obstacle to move in a direction opposite to the movement of the platform lift, positioning means to selectively position the moveable contact plate, shoulder means mounted on said contact plate, electric switch circuit means normally engaged by the shoulder means to retain activation of the electric controlled platform lift whereby the platform lift is arrested from powered movement as the electric switch circuit means is disengaged by the shoulder means with movement of the contact plate.

BRIEF DESCRIPTION OF THE DRAWING

The invention, both as to its structured apparatus and method of operation, together with further objects and advantages thereof will best be understood by reference to the following detailed description taken in connection with the depicted accompanying sheet of drawing, wherein.

DESCRIPTION OF THE PREFERRED EMBODIMENT

Figure 1:
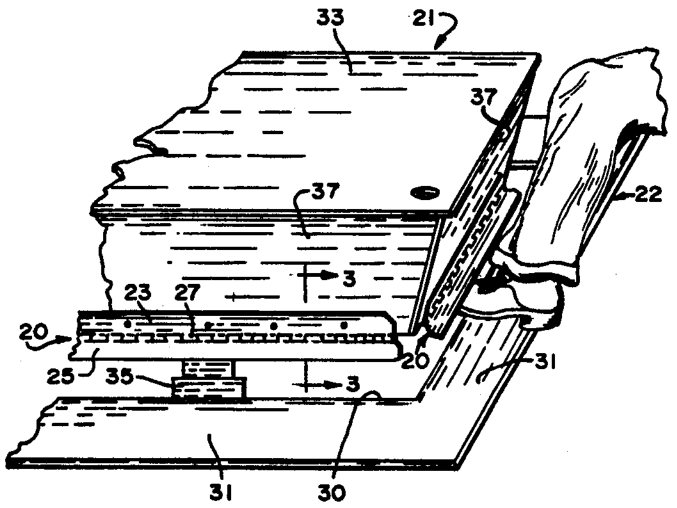
FIG. 1 is a frontal elevational view presented in fractional perspective of a vertical platform lift adapted for being fully received within a floor recess or aperture and having a collapsible safety foot-toe guard in accordance with the invention mounted to each outer side wall thereof showing a folding protruding contact plate aligned for engagement with any protruding obstacle.
Figure 2:
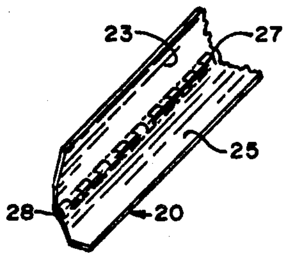
FIG. 2 is a fractional perspective view of the safety foottoe guard showing a base support plate and a contact plate conveniently joined for movement with respect to each other by hinge means.

Referring now to the drawing and more particulary to FIGS. 1 and 2 thereof, there is shown an apparatus or device 20 for comprising a protective or safety device for use with a vertically moving platform lift 21 to protect against inadvertent protrusion of human limbs 22 into the direct path of descent thereof in accordance with the present invention. The safety foot-toe guard 20 comprises a base support plate 23 and a depending contact plate 25 suitably joined to the base support plate 23 for movement with respect thereto through the provision of hinge means 27 employing conventional pivot pin means 28.

The platform lift 21 is of a type which when not in use is to be received within a floor recess or opening 30 defined by surrounding peripheral floor edge portions 31. The top loading surface 33 of the platform lift 21 is to be aligned generally coplanar or flush with the surface of the peripheral floor edge portions 31 with the platform lift 21 fully received within the floor recess 30. The platform lift 21 is generally a heavy duty loading type having electric controlled hydraulic actuation means, for which a central hydraulic actuator cylinder 35 is briefly shown in FIG. 1. The hydraulic actuator 35 is effective to cause controlled vertical ascent (lift) and vertical descent (drop) as is commonly understood in the pertinent art to which the present invention finds application. The detailed description of the invention does not attempt to disclose either a suitable hydraulic actuation system or the electric circuit controls therefor as these elements are thought to be well understood in the pertinent art and would only serve to unduly complicate or lengthen the present description of the preferred embodiment.

Figure 3:
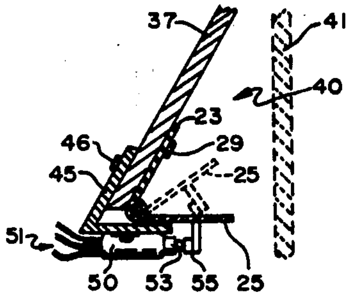
FIG. 3 is a fractional cross-sectional view of the safety foot-toe guard taken generally along the line 3—3 of FIG. 1 and showing mounted electric switch circuit means contacted by shoulder means attached to the moveable contact plate.

The platform lift 21 includes inwardly sloping side walls 37 to which it is most convenient to mount the safety foot-toe guard 20 through attachment of the base support plate 23 as by suitable fastener means 29 in FIG. 3. The base support plate 23 thus mounted becomes fixed or stationary with respect to the platform lift 21 and the depended moveable contact plate 25. It is a promulgated safety regulation in the structure of the platform lift 21 that the side wall 37 be inwardly downwardly sloped away from the vertical by approximately 15° to 30° angular degrees permitting or defining a planar offset between the vertical plane intersecting the top or upper edge portion of the side wall 37 and the vertical plane intersecting the bottom or lower edge portion of the side wall 37. The defined planar offset provides an inner cavity 40 most readily appreciated in FIG. 3 to exist between the side wall 37 and an adjacent floor wall which forms the floor recess 30, a fractional portion of the floor wall being shown at 41. It is intended for the maximum utility and advantage of the invention to provide that the safety guard 20 is preferably mounted to the lower outer edge portion of the side wall 37, and that the width of the contact plate 25 is limited so that pivotable movement thereof is not restricted by possible engagement with the adjacent floor wall 41. That is, the contact plate 25 is free to rotate upon encountering an obstacle in an arc of travel about the hinge means 27, the maximum arc of travel being limited by engagement of the contact plate 25 with the fixed base support plate 23. The aforementioned preferable mounting position of the safety guard 20 provides maximum exposure of the contact plate 25 to engage obstacles which lie in its downward path of travel during descent movement of the platform lift 21, and maximum width of the contact plate 25 to be accommodated for movement within the formed inner cavity 40.

As shown in the drawing, both the base support plate 23 and the hinged contact plate 25 are generally formed of flat plate stock and are similarly elongated to extend nearly the full length dimension of the side wall 37 to permit maximum exposure to users of the platform lift in a variety of postures and stances. The plates 23 and 25 can be made of a variety of materials with differing rigidities and masses, and the invention hereof is not to be restricted to a particular material or size of plate. The base plate 23 is conveniently selected to be of a corresponding width to that of the contact plate 25 but it should be appreciated that the width thereof is not dependent upon the width of the contact plate 25. The base plate 23 could be provided with a minimum width sufficient to permit the same to be secured to the side wall 37. Further, the fastener means 29 can be provided with a flatheaded screw to be completely received within the thickness of the base plate 23 in order to avoid surface protrusion thereof.

Figure 4:
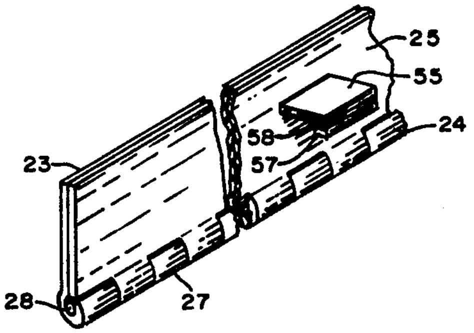
FIG. 4 is a fractional perspective view of the safety foot-toe guard showing the collapsed or folded position of the guard whereby the contact plate is moved to engage the base support plate.

The hinge means 27 is shown to be conveniently provided by interlaced meshing cylinders 24 (FIG. 4) formed from and on adjacently disposed edge portions of the plates 23 and 25, and held together by the suitably elongated pivot pin 28. Other hinge means could alternatively be provided within the context, utility and scope of the present invention. The contact plate 25 is most advantageously positioned to extend outwardly from the side wall 37 and base plate 23 to permit the flat underlying surface thereof to engage any obstacle lying in its downward path of travel upon the descent movement of the platform lift 21. The contact plate 25 can be suitably positioned to extend outwardly from the side wall 37 so as to be generally perpendicular to the side wall 37 as shown in FIG. 1 or to be angled to lie generally parallel with the top loading surface 33 of the platform lift 21. There is intended to be some flexibility of positioning of the contact plate 25 so that inadvertent deforming or change of the angular extension does not defeat the utility and successful operation of the safety guard 20.

In the preferred embodiment of the invention shown in FIG. 3 hereof, positioning means in the form of an angular brace member 45 is shown to have one leg portion thereof preferably secured by fastener means 46 to the side wall 37 of the platform lift 21 and to have the other free leg portion thereof engageable with the underlying surface of the contact plate 25 whereby the contact plate 25 is held in a desired outwardly depending angle from the side wall 37. It is easily appreciated that a plurality of such angular brace members are employed in spaced dispositions along the elongated dimension of the contact plate 25 to provide and maintain the proper angular dependency of the contact plate 25 from the side wall 37. Suitable positioning means other than the disclosed positioning means 45 could be alternatively provided to properly position the contact plate 25, and other configurations and embodiments thereof are intended to be encompassed within the context, utility and scope of the present invention so long as the contact plate is supported with complete freedom of movement to move in the upwardly directed arc of travel depicted by the displaced contact plate 25 shown in dashed lines in FIG. 3.

It is to be noted that as the platform lift 21 moves downwardly (descends) to be received within the floor recess 30, any underlying obstacle such as the human limb 22 that is encountered by the contact plate 25 will cause the contact plate 25 to begin to move away from the encountered obstacle in an angular arcing direction of movement having a component of movement opposite from the direction of movement of the descending platform lift 21. The engagement with the contact plate 25 should be felt by the user of the platform lift 21 to signal a response to withdraw the protruding limb or obstacle. Nevertheless, continued engagement of the obstacle will cause the contact plate 25 to continue to rotate to a maximum position of rotation whereby the contact plate 25 abuts and lies substantially coplanar with the base plate 23 (FIG. 4) and the side wall 37. The utility of this feature is to be appreciated to permit the same sloping engagement with the encountered obstacle as would be provided by the angular slope of the side wall promulgated to provide a desired camming effect to encourage forced undamaged removal of the endangered human limb.

In accordance with another important and novel feature of the improved safety guard of the present invention, there is provided electric switch circuit means 50 in the form of a wired normally open, held closed limit switch device electrically connectable as by lead wires 51 to the electric control circuit means (not shown) for the powered hydraulic actuated platform lift 21. The electric switch circuit means 50 has a push-type depressible actuator button 53 which is engaged by suitable shoulder means 55 attached to extend from the underlying surface of the contact plate 25. The engagement between the shoulder means 55 and the depressible actuator button 53 with the contact plate 25 in its uninterrupted outwardly depended position is effective to retain the actuator button 53 in a depressed state to permit uninterrupted operation of the powered movement of the platform lift 21. Any appreciable displaced movement of the contact plate 25 is readily understood to result in the release of the electric actuator button 53 to cause deactivation through electric discontinuity or circuit interruption of the powered movement of the platform lift 21. The electric switch circuit means 50 is conveniently secured to a selected one of the angular brace members 45 as by suitable bracket means and fastener means (not clearly shown in FIG. 3). Only a single such limit switch 50 need be employed with a given one of the safety guards 20 but a redundancy thereof could be provided for purposes of reliability in desired fail-safe applications.

In an alternative configuration for the electric activation and deactivation of the present invention, the shoulder means 55 could be suitably provided with an electrical conductor pad 57 (FIG. 4) and an intermediate layer of dielectric material 58 ( FIG. 4) to provide electrical current path continuity with suitable electric switch circuit means 50 other than a depressible actuator button type, so that displacement of the contact plate 25 results in the removal of the conductor pad 57 to interrupt the current path and deactivate the powered movement of the platform lift 21.

It is another advantage of the present invention that the contact plate 25 can be collapsed to fold into substantial coplanar position with the side wall 37 and then secured in such position for facility of shipment of safety guards 20 in an installed configuration with the platform lifts 21. The safety guard 20 has the advantage of being accommodated within the inner spacial cavity 40 without it being necessary to fold or collapse the contact plate 25 thereof. The safety guard 20 is completely protected from wear and tear during non-use storage of the platform lift 21 due to the same being received within the floor recess 30. The safety guard 20 has many improved features over the aforementioned prior art patented safety device and over any other known related prior art safety device, and is a commercially desired safety device.

It is to be appreciated that the movement action between the movement of the shoulder means 55 and the release of the actuator button 53 comprises a camming effect so that the shoulder means can be as readily identified as camming means. Further, the limit switch means 50 could be alternatively mounted against the inside surface of the side wall 37 by provision of an extended length dimension of the fastener means 29. The bracket means 45 could then be eliminated by providing camming plate means to extend coplanar with and from the contact plate 25 to engage the accessible downwardly facing actuator button 53. The camming plate means would be secured to the contact plate 25 and moveable therewith as also was the camming shoulder means 55. The engagement between such camming plate means and the actuator button 53 would constitute the means of properly positioning the contact plate 25 with respect to the base plate 23 and the side wall 37. Such camming plate means would extend from the contact plate 25 to appear much like the free end leg portion of the dispensable bracket means 45. Even though this configuration is not shown in the drawing, it can be readily and fully appreciated and understood by a consideration of the description thereof in connection with the embodiment of FIG. 3. The obvious advantage to such an alternative mounting for the limit switch means 50 would be to provide mounting inaccessibility and isolation for the limit switch means 50 for protective reasons.

Other alternative equally useful and/or equivalent configurations and mounting arrangements could no doubt be thought of and/or employed to accomplish the intent and purpose of the present invention. It is to be understood that while the present invention has been shown and described with reference to the preferred embodiments thereof, the invention is not limited to the precise forms set forth, and that various modifications and changes may be made therein without departing from the true spirit and scope of the present invention.

What is claimed is:

1. A collapsible safety guard for use with electric controlled powered moving platform means having vertical lift and descent movements comprising in combination, first plate means of generally elongated length dimension to be mounted to said platform means for movement therewith, second plate means of generally corresponding elongated length dimension to be pivotably attached to said first plate means, hinge means attaching said second plate means to said first plate means for pivotable movement therebetween, means for positioning said second plate means in a first selected angular depended position with respect to said first plate means, said positioning means being effective to arrest pivotable movement of said second plate means in a first rotational direction of travel about said first plate means and being effective to allow pivotable movement of said second plate means in a second and opposite rotational direction of travel toward engagement with said first plate means, said second plate means being moved in said second direction of travel when engaged by any encountered obstacle lying in the descending path of travel of said platform means, and being moved with continued engagement by said obstacle to be folded into engagement with said first plate means, and said first and second plate means when engaged comprising camming means to force said encountered obstacle from the path of travel of said platform means.

2. A collapsible safety guard as claimed in claim 1 wherein electric switch circuit means are provided in electrical connection with electric control circuit means controlling powered movement of said platform means, shoulder means are provided mounted to said second plate means for movement therewith and which engage said electric switch circuit means with said second plate means in said first selected angular depended position thereof, and said electric switch circuit means being effective upon release of engagement by said shoulder means to signal said electric control circuit to deactivate continued descending movement of said platform means.

3. A collapsible safety guard as claimed in claim 2 wherein said electric switch circuit means comprise electric limit switch means having depressible releaseable actuator button means, and are wired to provide normally open deactivation signals and held closed activation signals, said shoulder means being effective to hold said actuator button depressed with said second plate means in said first selected angular depended position thereof to provide said activation signal and effective with movement of said second plate means to release said actuator button to provide said deactivation signal for signaling said electric control circuit means to arrest continued descending movement of said platform means.

4. A collapsible safety guard for use with electric controlled powered moving platform means having vertical lift and descent movements comprising plate means having a fixed plate portion thereof to be mounted to a selected peripheral portion of said platform means and having a moveable plate portion thereof, and further having hinge means interconnecting said fixed and moveable plate portions, means for positioning said moveable plate portion in a first selected angular depended position with respect to said fixed plate portion, said positioning means being effective to prevent pivotable movement of said moveable plate portion in a first rotational direction about said fixed plate portion and being effective to permit pivotable movement of said moveable plate portion in a second opposite rotational direction toward engagement with said fixed plate portion, said moveable plate portion being moved in said second direction when engaged by any encountered obstacle lying in the descending path of said platform means, and being moved with continued engagement by said obstacle to be folded into engagement with said fixed plate portion, and said fixed and moveable plate portions when engaged and said fixed and moveable plate portions when engaged comprising camming means to force said encountered obstacle from the descent path of said platform means.

5. A collapsible safety guard as caimed in claim 4 wherein electric switch circuit means are provided in electrical connection with electric control circuit means controlling powered lift and descent movements of said platform means, said electric switch circuit means being electrically activated to signal continued movement of said platform means with said moveable plate portion at rest in said first selected angular depended position thereof and being electrically deactivated to signal termination of movement of said platform means with angular movement of said moveable plate portion in said second direction .

6. A collapsible safety guard as claimed in claim 5 wherein shoulder means are provided mounted to said moveable plate portion and which engage said electric switch circuit means with said moveable plate portion at rest in said first selected angular depended position thereof to provide through contact therewith said activation signal and to provide through break of contact therewith said deactivation signal.

* * * * *